(12) United States Patent
Kearl et al.

(10) Patent No.: US 7,491,457 B2
(45) Date of Patent: Feb. 17, 2009

(54) FUEL CELL APPARATUS

(75) Inventors: Daniel A. Kearl, Philomath, OR (US);
Ted W. Barnes, Corvallis, OR (US);
David Champion, Lebanon, OR (US);
Gregory Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1044 days.

(21) Appl. No.: 10/222,417

(22) Filed: Aug. 16, 2002

(65) Prior Publication Data

US 2004/0033398 A1    Feb. 19, 2004

(51) Int. Cl.
*H01M 8/04* (2006.01)
(52) U.S. Cl. .......................................... 429/22; 429/26
(58) Field of Classification Search ........................ None
See application file for complete search history.

(56) References Cited

U.S. PATENT DOCUMENTS

| | | | |
|---|---|---|---|
| 5,532,573 A | 7/1996 | Brown et al. | |
| 5,678,647 A | 10/1997 | Wolfe et al. | |
| 6,288,456 B1 | 9/2001 | Cratty | |
| 6,835,481 B2 * | 12/2004 | Dickman et al. | 429/19 |
| 6,858,335 B2 * | 2/2005 | Schmidt et al. | 429/13 |
| 2002/0045082 A1 * | 4/2002 | Marsh | 429/30 |

FOREIGN PATENT DOCUMENTS

| | | |
|---|---|---|
| GB | 1304092 | 1/1973 |
| JP | 62-150664 | 7/1987 |

* cited by examiner

*Primary Examiner*—Patrick Ryan
*Assistant Examiner*—A Echelmeyer

(57) ABSTRACT

A fuel cell apparatus including fuel cell blocks electrically re-configurable in at least two arrangements by a control module.

12 Claims, 13 Drawing Sheets

FUEL CELL APPARATUS

BACKGROUND

Over the past century the demand for energy has grown exponentially. With the growing demand for energy, many different energy sources have been explored and developed. One of the primary sources for energy has been and continues to be the combustion of hydrocarbons. However, the combustion of hydrocarbons is usually incomplete combustion and releases non-combustibles that contribute to smog as well as other pollutants in varying amounts.

As a result of the pollutants created by the combustion of hydrocarbons, the desire for cleaner and more efficient energy sources has increased in recent years. With the increased interest in cleaner energy sources, fuel cells have become more popular and more sophisticated. Research and devolvement on fuel cells has continued to the point where many speculate that fuel cells will soon compete with the gas turbine generating large amounts of electricity for cities, the internal combustion engine powering automobiles, and batteries that run a variety of small and large electronics. However, there are many applications with a variety of modulating power needs that cannot be met by current fuel cell technology.

Fuel cells conduct an electrochemical energy conversion of fuel and oxidant into electricity and heat. Fuel cells are similar to batteries, but they can be "recharged" while providing power.

Fuel cells provide a DC (direct current) voltage that may be used to power motors, lights, or any number of electrical appliances. There are several different types of fuel cells, each using a different chemistry. Fuel cells are usually classified by the type of electrolyte used. Fuel cells are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

In general, a fuel cell includes the following basic elements: an anode, a cathode, an electrolyte, and one or more catalysts arranged at the interfaces between the anode and the electrolyte, and the cathode and the electrolyte. Element composition may vary in each of the above-mentioned varieties of fuel cell.

While the development of fuel cells has been rapid in recent years, there are sill several shortcomings. One of the difficulties with current fuel cells is a lack of versatility. Typical fuel cell arrangements are only able to produce power within relatively narrow parameters and are not capable of significant power modulations. However, may modern electronic devices demand multiple voltages and currents that can vary significantly. Thus, typical fuel cells cannot supply power for many of today's modern electronic devices.

SUMMARY

In one of many possible embodiments, the present specification describes a fuel cell apparatus including fuel cell blocks electrically re-configurable in at least two arrangements by a control module.

BRIEF DESCRIPTION OF THE DRAWINGS

The foregoing and other features and aspects of the principles described herein will become further apparent upon reading the following detailed description and upon reference to the drawings in which.

Figure 1:
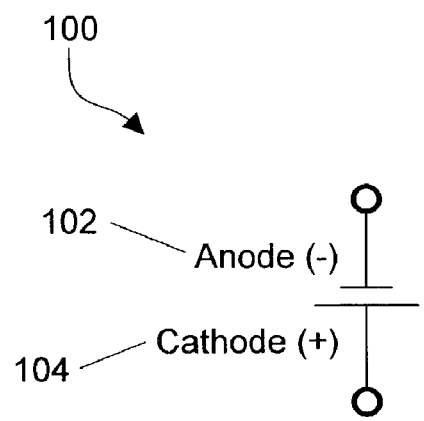
FIG. 1 is a representation of a single cell fuel cell apparatus according to principles described herein.

In the drawings, identical reference numbers indicate similar, but not necessarily identical, elements. While the principles described herein are susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF ILLUSTRATED EMBODIMENTS

Illustrative embodiments of the principles disclosed herein are described below. As will be appreciated by those skilled in the art, these principles can be implemented in a wide variety of fuel cell applications. The fuel cell applications include, but are not limited to, PEM fuel cells, AFCs, PAFCs, SOFCs, and MCFCs.

Figure 2:
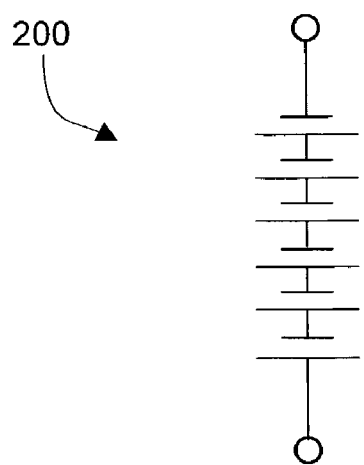
FIG. 2 is a representation of a fuel cell block or stack according to principles described herein.

Turning now to the figures, and in particular to FIG. 1, a representation of a single cell fuel cell apparatus (100) is shown according principles described herein. The fuel cell apparatus (100) may be any of the fuel cell types mentioned above, and includes an anode (102) and a cathode (104). Common fuel cell operating voltages range from an open circuit voltage of about 1.0 to 1.2 volts, down to a dead short voltage. Because even the open circuit voltage is relatively low, it is common to arrange fuel cells into multiple stack or blocks as shown in FIG. 2. A "stack" or "block" (200) may include one or more individual fuel cells connected together to increase the output voltage. According to the embodiment of FIG. 2, a fuel cell apparatus (200) is shown in a series combination of six cells to increase the voltage available to an electrical load. However, it will be understood that fuel cell apparatus (200) is exemplary in nature and that the number of cells in a fuel cell stack may be any number, from the single cell configuration shown in FIG. 1 to a configuration with hundreds of cells or more.

Figure 3:
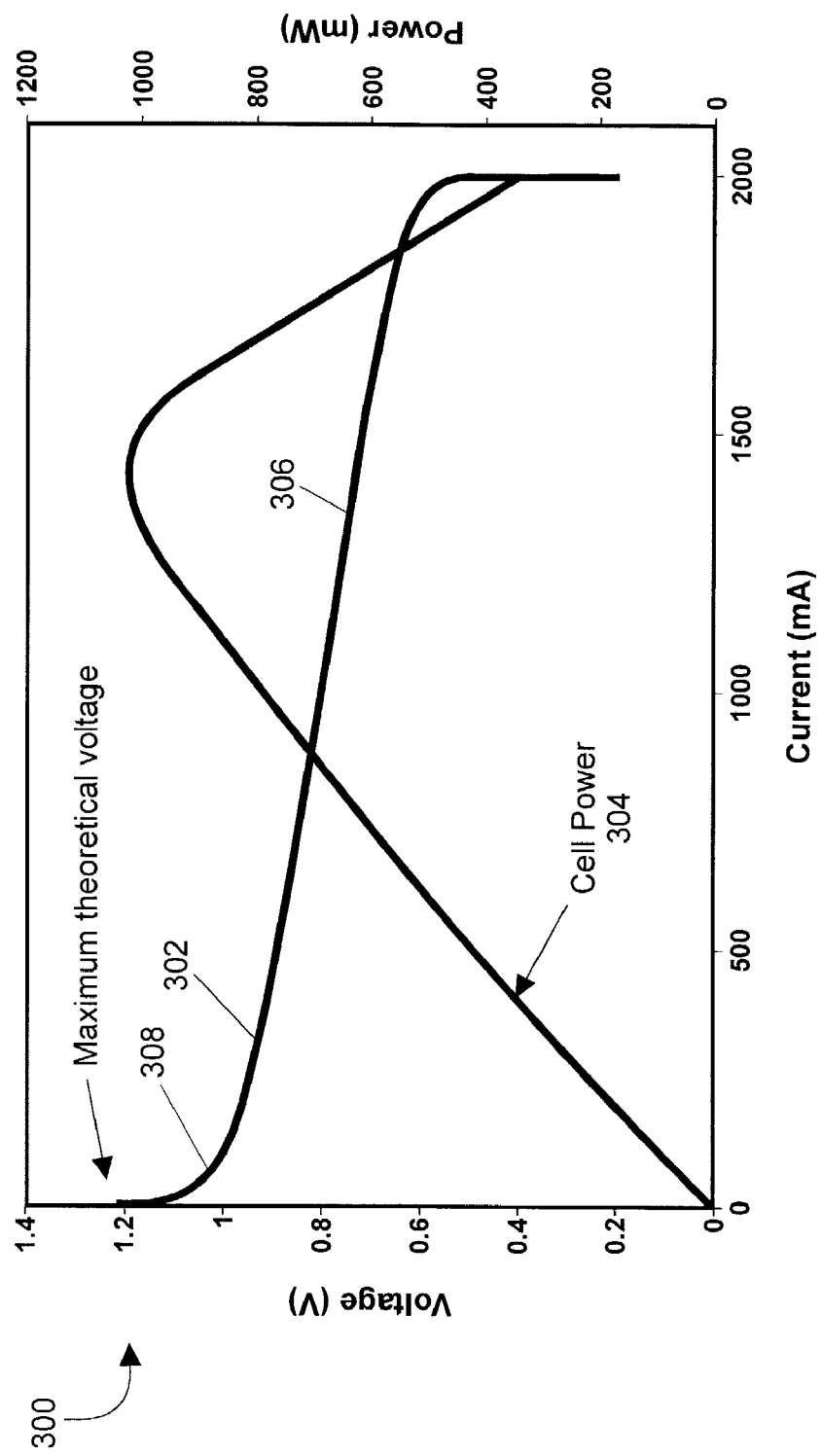
FIG. 3 is a sample polarization plot for a fuel cell according to principles described herein.

While the open circuit voltage of most fuel cells is 1.0 to 1.2 volts, maximum power output is often realized in the 0.5 (+/−0.2) Volt range. A polarization plot (300), such as that shown in FIG. 3 is typical of many fuel cells including the fuel cell apparatus (200) of FIG. 2. The polarization plot (300) shows a relationship chart (302) of voltage and current. A fuel cell power output curve (304) is also shown on the same plot (300). This curve (304) indicates that the maximum power output for the exemplary fuel cell under consideration is approximately 1000 mW at a voltage of about 0.7 V.

Even though power output may be maximized for most fuel cells near a center (306) of the polarization plot (300), fuel cells normally operate more efficiently at a near end (308) of the plot (300). That is, fuel cells may more efficiently generate electricity from various chemical reactions when operating at higher voltages and lower currents, than near the maximum theoretical voltage for the particular fuel cell. Fuel cell efficiency rapidly decreases as the current supplied increases. Therefore, to maximize fuel system efficiency, careful trade-offs between fuel cell power output and efficiency must be made. According to conventional fuel cell usage, the trade off decisions are made only once according to anticipated load demands on the fuel cell. The fuel cell may, therefore, run at highly inefficient rates quite often as the demands of the load change. However, according to principles described herein, the fuel cell can advantageously be electrically reconfigured to maximize efficiency. This reconfiguration may occur regularly or continuously. In addition, the fuel cell power structures enabling electrical reconfigurability advantageously provide for multiple voltages and currents to be supplied simultaneously to electrical appliances.

Figure 4:
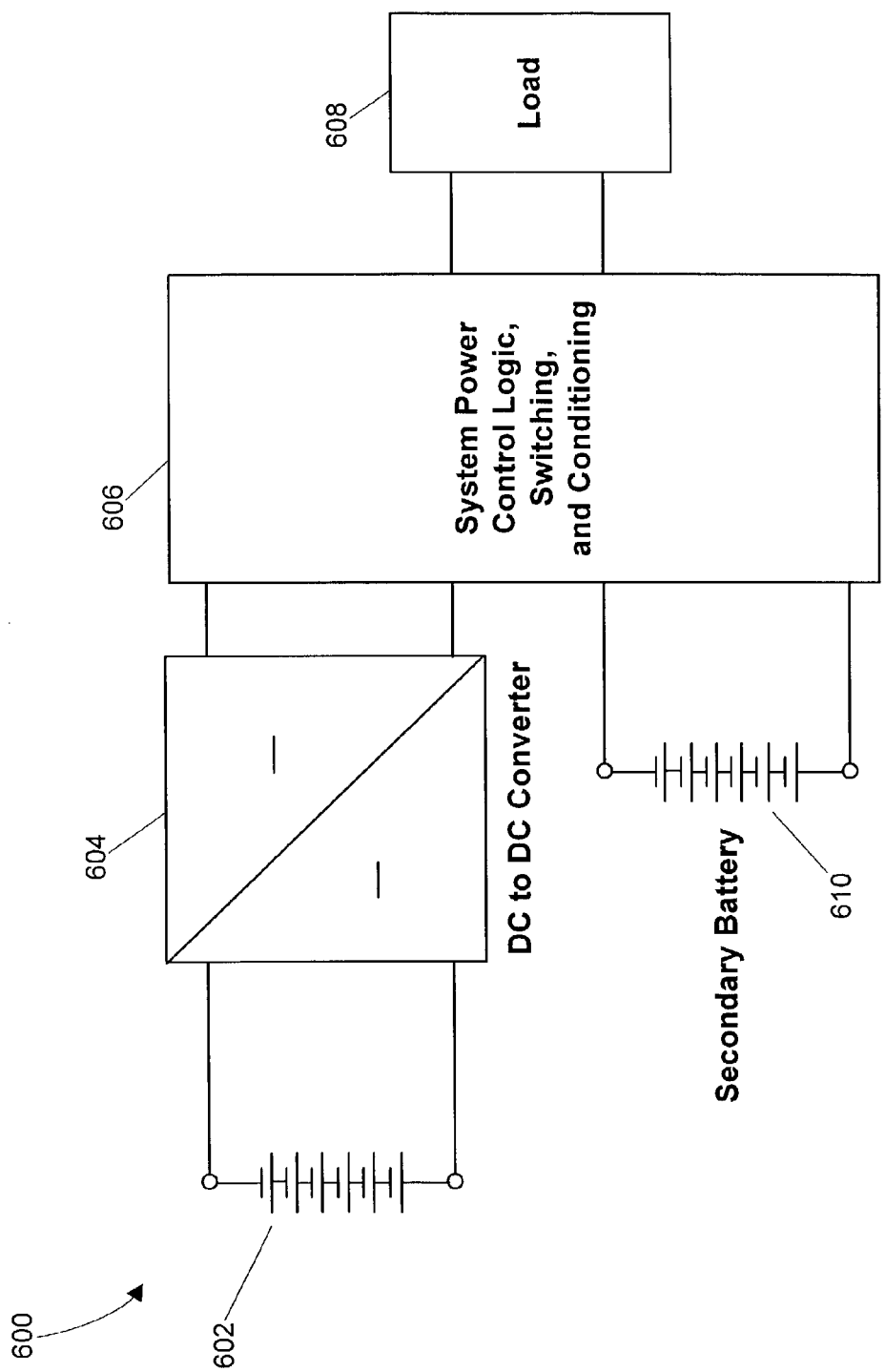
FIG. 4 is a block diagram of a fuel cell power system according to principles described herein.

Referring next to FIG. 4, a fuel cell power system (600) is shown that facilitates fuel cell stack reconfiguration according to principles described herein. The fuel cell power system (600) may include a fuel cell supply (602) that is re-configurable in a plurality of electrical arrangements. The fuel cell supply (602) is connected to a voltage converter, for example DC-to-DC converter (604). The fuel cell supply (602) is representative in nature, and the details of the fuel cell supply's internal arrangement are discussed below with reference to FIGS. 5-6. In some embodiments, the DC-to-DC converter (604) may be replaced by a DC-to-AC inverter for providing an AC current to a load (608).

The fuel cell power system (600) may also includes a backup power supply such as a secondary battery (610) electrically connected to the load (608). The secondary battery (610) is preferably a rechargeable battery. The secondary battery (610) may be included to provide short-term load "peak-leveling," system start-up power, stand-by or system "sleep" power, or other power needs. Alternatively, the secondary battery (610) may be used in combination with, or replaced by, a super-capacitor. The capacity of the secondary battery (610) and/or a super-capacitor may involve weighing several factors including, but not limited to: anticipated load profiles, system weight and volume, component cost and complexity, fuel cell start-up duration and parasitic load (e.g. electrical control, switch, and devices, etc.), and system efficiency. Those of skill in the art having the benefit of this disclosure will be able to readily size such a backup power supply based on the particular requirements of the application.

The fuel cell supply (602), DC-to-DC converter (604), and (if included) secondary battery (610) may be in electrical communication with a control module (606). The control module (606) may include control logic circuitry, signal conditioning circuitry, switch control circuitry, and other functionality to facilitate the reconfiguration of the fuel cell supply (602) to optimal settings and to utilize or recharge the rechargeable secondary battery (610). The control module (600) may be found from a variety of sources available to those of skill in the art having the benefit of this disclosure. For example a Motorola 68HCxx series microcontroller may be used.

The control module (606) control logic may be programmed to accept input from a variety of sources and calculate an optimal fuel cell stack configuration based on the input received and the possible fuel cell supply (602) configurations available. The input may include, but is not limited to, load (608) characteristics, fuel cell performance (which may include fuel cell efficiency, fuel utilization, temperature, reactant and/or product composition and flow, net power output, where on a polarization curve the fuel cells are operating, etc.), state of battery (610) charge, active feedback from the load (608), and other input data.

The fuel cell supply (602) preferably includes a number of fuel cells or fuel cell stacks that are interconnected by switches that can be opened or closed to create different configurations of fuel cells and fuel cell stacks connected to the rest of the system (600). The control module may be programmed to reconfigure the fuel cell supply (602) by selectively and/or progressively connecting one or more fuel cells or fuel cell stacks of the fuel cell supply (602) to the DC-to-DC converter (604) or to one another to meet the load demands and operate at peak performance. The connection of fuel cells or fuel cell stacks may be done in series, parallel, or a combination of series and parallel according to the calculations made by the control module (606). When the control module (606) receives the various inputs and calculates an optimal fuel cell stack configuration to meet the load demands, the control module may cause various switches in the fuel cell supply (602) to open or close to effect the reconfiguration of the fuel cell supply (602) and the resulting output of the fuel cell supply (602) to the rest of the system (600). In addition, the control module (606) may regularly, continuously, or otherwise rotate usage among the individual stacks of the fuel cell supply (602) to add longevity and reliability to the system (600). A regular rotation among the individual stacks of the fuel cell supply (602) may benefit the stacks by conditioning the anodes and cathodes. In fuel cells using hydrocarbon fuels, it is common for coking to occur on the anode at open circuit potential. Therefore, cycling the individual stack usage advantageously provides regular loads to the stacks to prevent coking of the anodes. The control module (606) may be programmed to automatically perform all monitoring and reconfiguration functions without any human intervention. In addition, the control module (606) may be dynamic, causing the bypass of any individual cells or stacks that may become damaged.

Figure 5A:
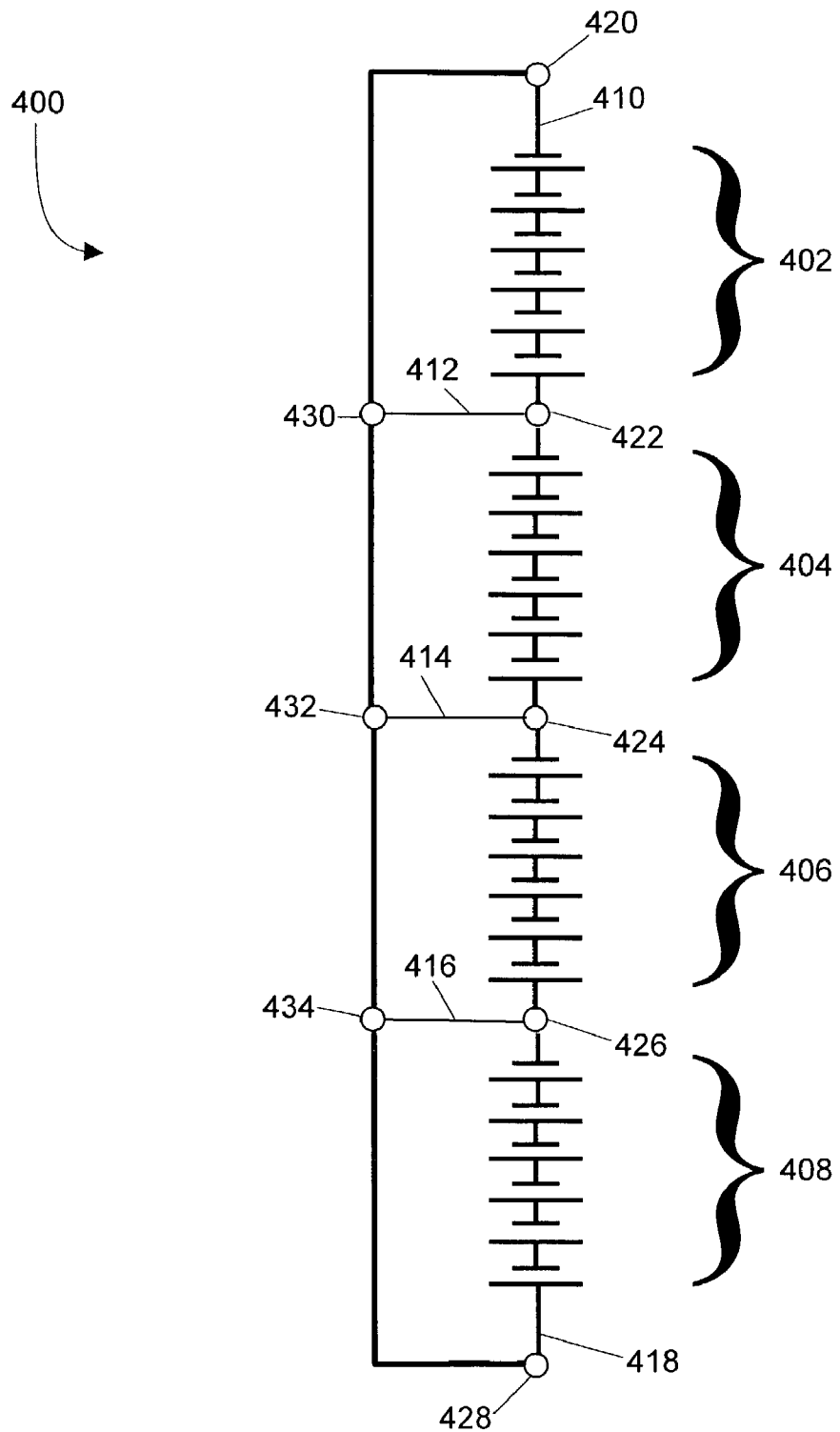
FIG. 5A is a representation of a reconfigurable fuel cell apparatus according to principles described herein.

The advantageous reconfiguration of the fuel cell source (602) by the control module (606) may be facilitated by the structure of the fuel cell source (602). Referring next to FIG. 5A, a reconfigurable fuel cell supply (400) is shown according to principles described herein. The fuel cell supply (400) is one example of the structural configuration the fuel cell supply (602; FIG. 4) may take. The fuel cell supply (400) includes a plurality of fuel cell blocks or stacks (402). In the present embodiment a series combination of four blocks (402/404/406/408) of six cells each, or twenty-four individual cells is shown. The series combination of the four blocks (402/404/406/408) is, however, examplary in nature and any number of other combinations may be substituted for the combination shown. In addition, the actual number of cells in each individual block (402) is not necessarily six (as it is in the present embodiment), nor is the number of cells in each block necessarily equal.

According to the embodiment of FIG. 5A, the fuel cell supply (400) may include at least one tap (412/414/416) between each of the fuel cell blocks (402/404/406/408) and at least one tap (410/418) extending from the first (402) and last (408) fuel cell blocks. The taps (412/414/416) may include any electrically conductive elements. Each of the taps (410/412/414/416/418) may be electrically tied to at least one switch (420/422/424/426/428, respectively) to selectively connect or disconnect one or more of the fuel cell stacks (402/404/406/408) to one another and/or to a voltage converter (such as a DC-to-DC converter (604) shown with reference to FIG. 4 above). For example, based on load demands, one of the fuel cell blocks (406) may sometimes be electrically disconnected from the DC-to-DC converter (604, FIG. 4) by toggling one or more of the switches, for example the switches (424 and 426) tied between the third fuel cell block (406) and the second (404) and fourth (408) fuel cell blocks, causing a bypass of the third fuel cell block (406). The switches (420/422/424/426/428) may be solid state devices or relays.

Figure 5B:
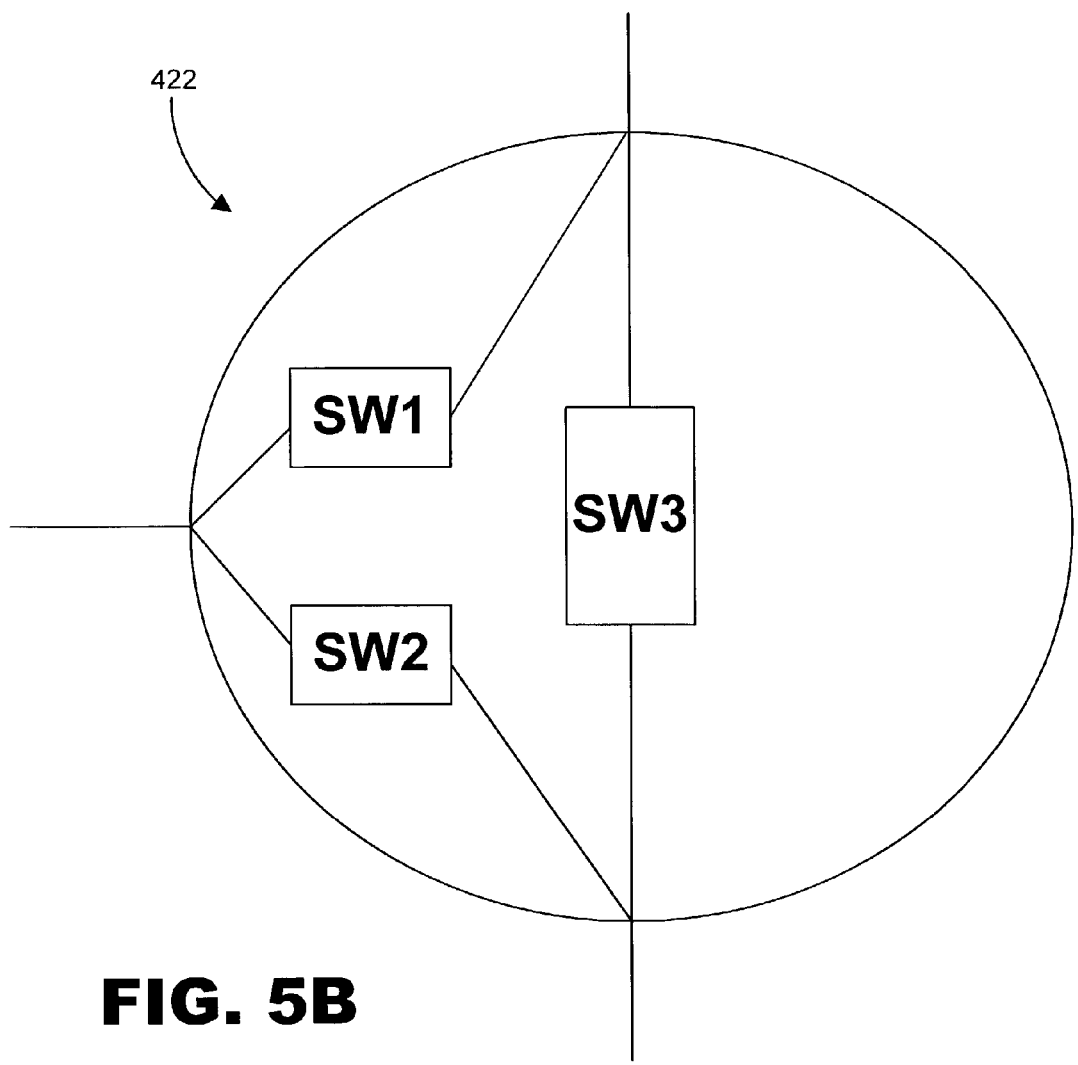
FIG. 5B is a representation of the nodes shown in FIG. 5A.
Figure 5C:
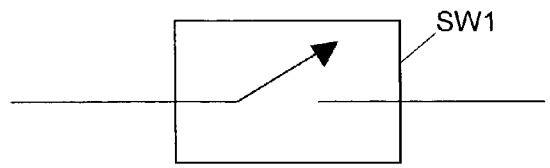
FIG. 5C is a representation of the switches shown in FIG. 5B.

A detail of one or more of the switches (420/422/424/426/428) according to one example is shown in FIGS. 5B and 5C. For example, switch 422 may include a combination of three switches (SW1/SW2/SW3) to facilitate different arrangements of the fuel cell blocks. Each of the three switches (SW1/SW2/SW3) may include the details shown in FIG. 5C in a schematic format.

The taps (410/412/414/416/418) may include interconnections in addition to the ones shown in FIG. 5A. The taps (410/412/414/416/418) may also include fewer connections than shown in the examplary embodiment of FIG. 5A. It is within the purview of the skilled artisan with the benefit of this disclosure to determine what the load parameters may be and provide taps and other interconnections and switches alterative to the ones shown in order to enable the reconfiguration of the fuel cell supply (400) to best meet the anticipated load parameters.

Therefore, by providing one or more taps (410/412/414/416/418) to the fuel cell blocks (402/404/406/408), the fuel cell supply (400) may be reconfigured by the control module (606, FIG. 4) in any number of ways to adjust for different load requirements and facilitate the efficient operation of each individual fuel cell block. As shown in FIG. 5A, the taps (412/414/416) of the fuel cell blocks (404/406/408) interior to the first (402) and last (408) fuel cell blocks may include at least a second switch (430/432/434, respectively) to further facilitate the reconfiguration of the fuel cell supply (400). The second switches (430/432/434) may, for example, enable the fuel cell supply (400) to be electrically reconfigured to bypass or disconnect multiple fuel cell blocks (404 and 406) by toggling several switches (such as switches designated by elements 422, 424, 426, 430, 432, and 434).

When a fuel cell block such as the second fuel cell block (404) is bypassed from the fuel cell supply (400) or disconnected from the DC-to-DC converter (604, FIG. 4) by electrically reconfiguring the fuel cell supply (400), the chemical reactants normally supplied to the individual cells or the entire block (404) may be discontinued in some embodiments, putting the bypassed or disconnected fuel cell block (404) in a "sleep" or stand-by mode. Accordingly, the control module (606) may include circuitry, logic, and control capability for causing valves or other control apparatus to shut off the supply of reactants to individual fuel cells or entire fuel cell blocks (404). Alternatively, the chemical reactant supply may be unchanged in some embodiments when the fuel cell block (404) is bypassed or disconnected. In many fuel cell types, when the fuel cell is in an open-circuit condition, the fuel cell stops or significantly reduces the chemical reaction, which may facilitate a "sleep" or stand-by mode in the bypassed or disconnected fuel cell block (404) automatically upon electrical disconnection.

Figure 6:
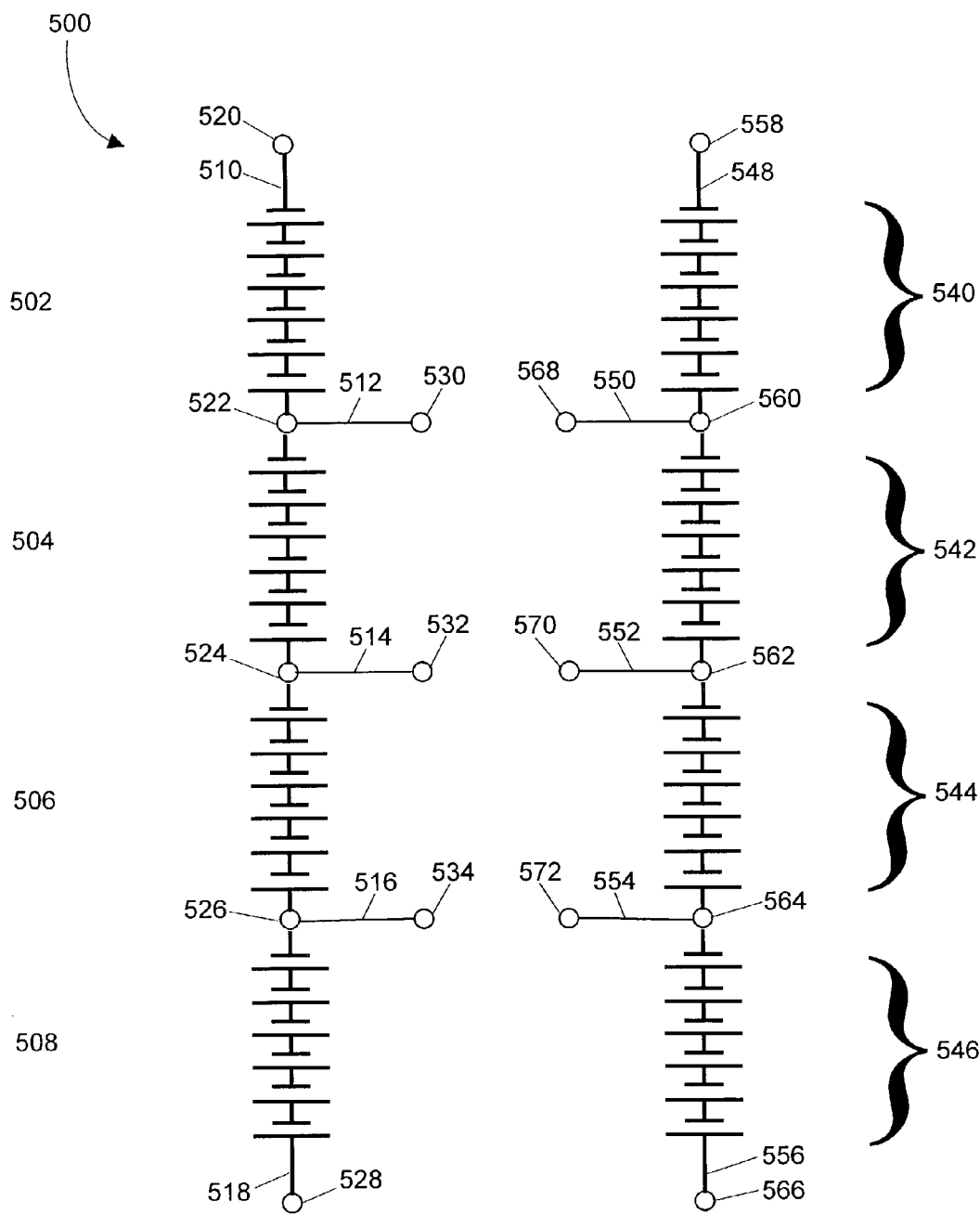
FIG. 6 is a representation of a reconfigurable fuel cell apparatus according to principles described herein.

Turning next to FIG. 6, another reconfigurable fuel cell supply (500) is shown. The fuel cell supply (500) is another example of the structural configuration the fuel cell source (602; FIG. 4) may take. The fuel cell supply (500) includes a plurality of fuel cell blocks or stacks (502), in the present embodiment a series combination of four blocks (502/504/506/508) of six cells each, configurable in parallel with a second series combination of four blocks (540/542/544/546) of six cells each. The series/parallel combination of the eight blocks (502/504/506/508 and 540/542/544/546) is, however, examplary in nature and any number of other series/parallel combinations may be substituted for the combination shown. In addition, the actual number of cells in each individual block (502) is not necessarily six (as it is in the present embodiment), nor is the number of cells in each block necessarily equal. The number of cells in the blocks (502, etc.) may be chosen based on the anticipated system load characteristics, and the desired granularity of variations in net fuel cell power output.

According to the embodiment of FIG. 6, the fuel cell supply (500) may include at least one tap (512/514/516) between each of the first set of fuel cell blocks (502/504/506/508), and at least one tap (510/518) extending from the first (502) and last (508) fuel cell blocks of the first set. Similarly, the fuel cell supply (500) may include at least one tap (550/552/554) between each of the second set of fuel cell blocks (540/542/544/546) and at least one tap (548/556) extending from the first (540) and last (546) fuel cell blocks of the second set. Each of the taps (510/512/514/516/518/548/550/552/554/556) may be electrically tied to at least one switch (520/522/524/526/528/558/560/562/564/566, respectively) to selectively connect or disconnect one or more of the fuel cell blocks (502, etc.) to/from one another or to/from the DC-to-DC converter (604, FIG. 4). For example, based on load demands, sometimes one of the fuel cell blocks (544) may be electrically disconnected from the fuel cell supply (500) by toggling one or more switches, for example the switches (562 and 564) tied between the third fuel cell block (544) and the second (542) and fourth (546) fuel cell blocks, disconnecting the third fuel cell block (544). One or more of the switches (520, etc.) may be configured as shown and discussed with reference to FIGS. 5B and 5C above. The taps (510, etc.) may include many interconnections to facilitate the reconfiguration of the fuel cell blocks (502, etc.) in any number of ways to provide for different electrical load requirements. It is within the purview of the skilled artisan with the benefit of this disclosure to determine what the load parameters may be and provide taps and other interconnections and switches alternative to the ones shown to enable the reconfiguration of the fuel cell supply (500) to best meet the load parameters.

Therefore, by providing one or more taps (510, etc.) to the fuel cell blocks (502, etc.), the fuel cell supply (500) may be reconfigured in any number of ways to adjust for different load requirements and facilitate the efficient operation of each individual fuel cell block. As shown in FIG. 6, the taps (512/514/516) of the first series set of fuel cell blocks (504/506/

508) interior to the first (502) and last (508) fuel cell blocks may include at least a second switch (530/532/534, respectively) to further facilitate the reconfiguration of the fuel cell supply (500). Similarly, the taps (550/552/554) of the second series set of fuel cell blocks (542/544/546) interior to the first (540) and last (546) fuel cell blocks may include at least a second switch (568/570,572, respectively) to further facilitate the reconfiguration of the fuel cell supply (500). The second switches (530/532/534/568/570/572) may, for example, enable the fuel cell supply (500) to be electrically reconfigured to connect and/or bypass multiple fuel cell blocks in various series/parallel combinations by toggling one or more switches. As discussed above, the switches may be controlled by the control module (606, FIG. 4) which may evaluate the input received, the possible reconfiguration available, and then cause an optimal reconfiguration of the blocks to take place.

When a fuel cell block such as the second fuel cell bock (504) is bypassed or disconnected by electrically reconfiguring the fuel cell supply (500), the chemical reactants normally supplied to the individual cells or the entire block (504) may be discontinued in some embodiments, putting the bypassed or disconnected fuel cell block (504) in a "sleep" or stand-by mode. In embodiments where it is desirable to selectively shut off the chemical supply to individual fuel cell blocks (502, etc.), it may be necessary to plumb each of the fuel cell blocks (502, etc.) with independent chemical supply and discharge lines that are controllable by the control module (606, FIG. 4). Alternatively, the chemical reactant supply may be unchanged in some embodiments when the fuel cell block (504) is bypassed or disconnected. In many fuel cell types, when the fuel cell is in an open-circuit condition, the fuel cell stops or significantly reduces the chemical reaction, which may facilitate a "sleep" or stand-by mode in the bypassed or disconnected fuel cell block (504) automatically when it is bypassed or disconnected.

The reconfigurable fuel cell supply (500) may be arranged such that the individual fuel cell blocks (504/506/542/544) that are believed to be operational most often are centered in the supply (500) as so to provide heat to the outer fuel cell blocks (502/508/540/546) when the outer blocks are not in operation. The central location of the most-used fuel cell blocks may be important for heating purposes so that any "sleeping" fuel cell stacks may be quickly functional when needed.

Figure 7:
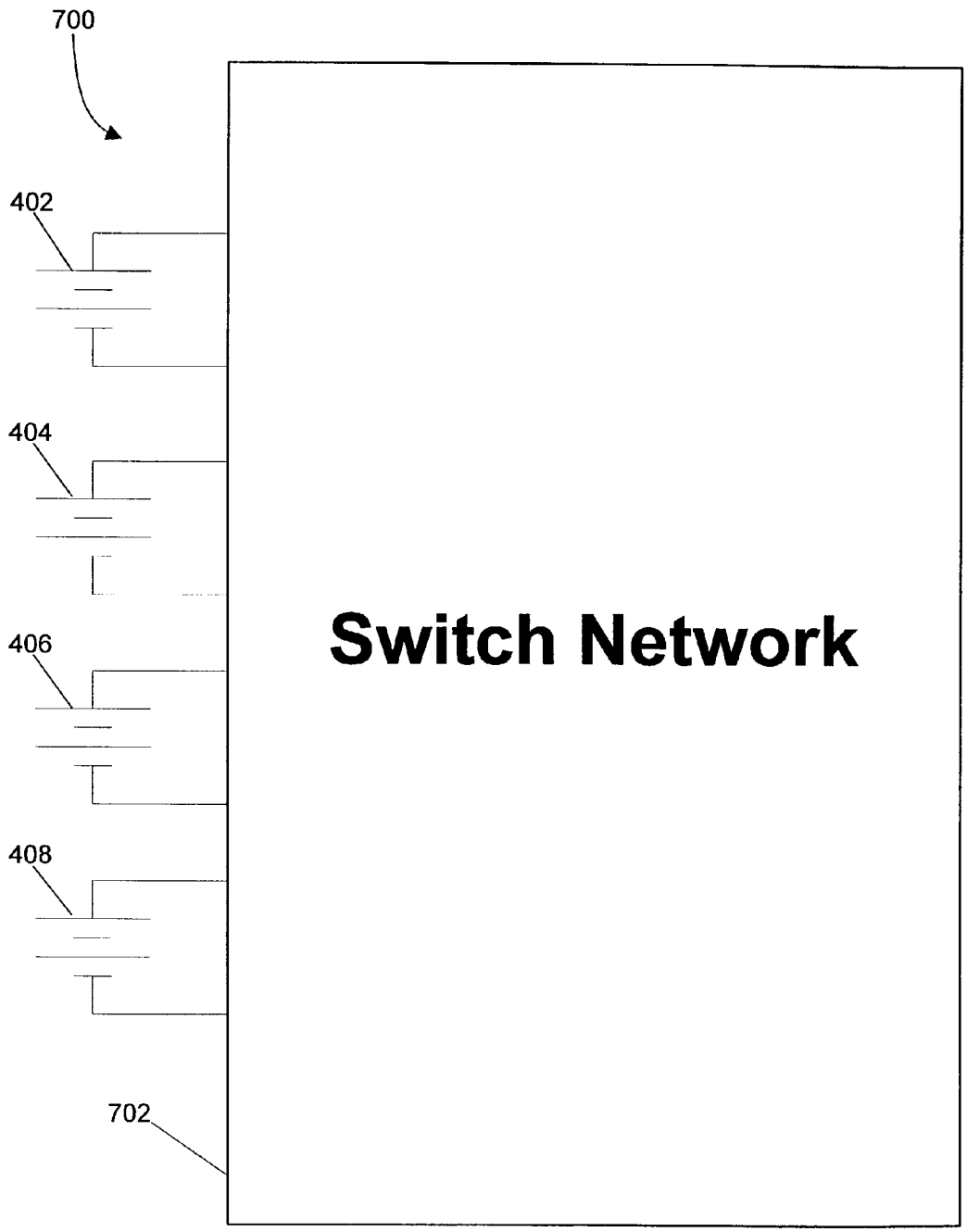
FIG. 7 is a representation of reconfigurable fuel cell apparatus according to principles described herein.

Referring next to FIG. 7, a fuel cell power system (700) according to principles described herein. According to the embodiment of FIG. 7, the fuel cell power system (700) may include the multiple fuel cell blocks (402/404/406/408) each electrically connected to a switch network (702). It will be understood that there may a greater or lesser number of fuel cell blocks electrically connected to the switch network and that the embodiment shown is exemplary in nature. The switch network (702) may include any number of switches and connections to enable the reconfiguration of the fuel cell blocks (402/404/406/408), examples of which are discussed below.

Figure 8:
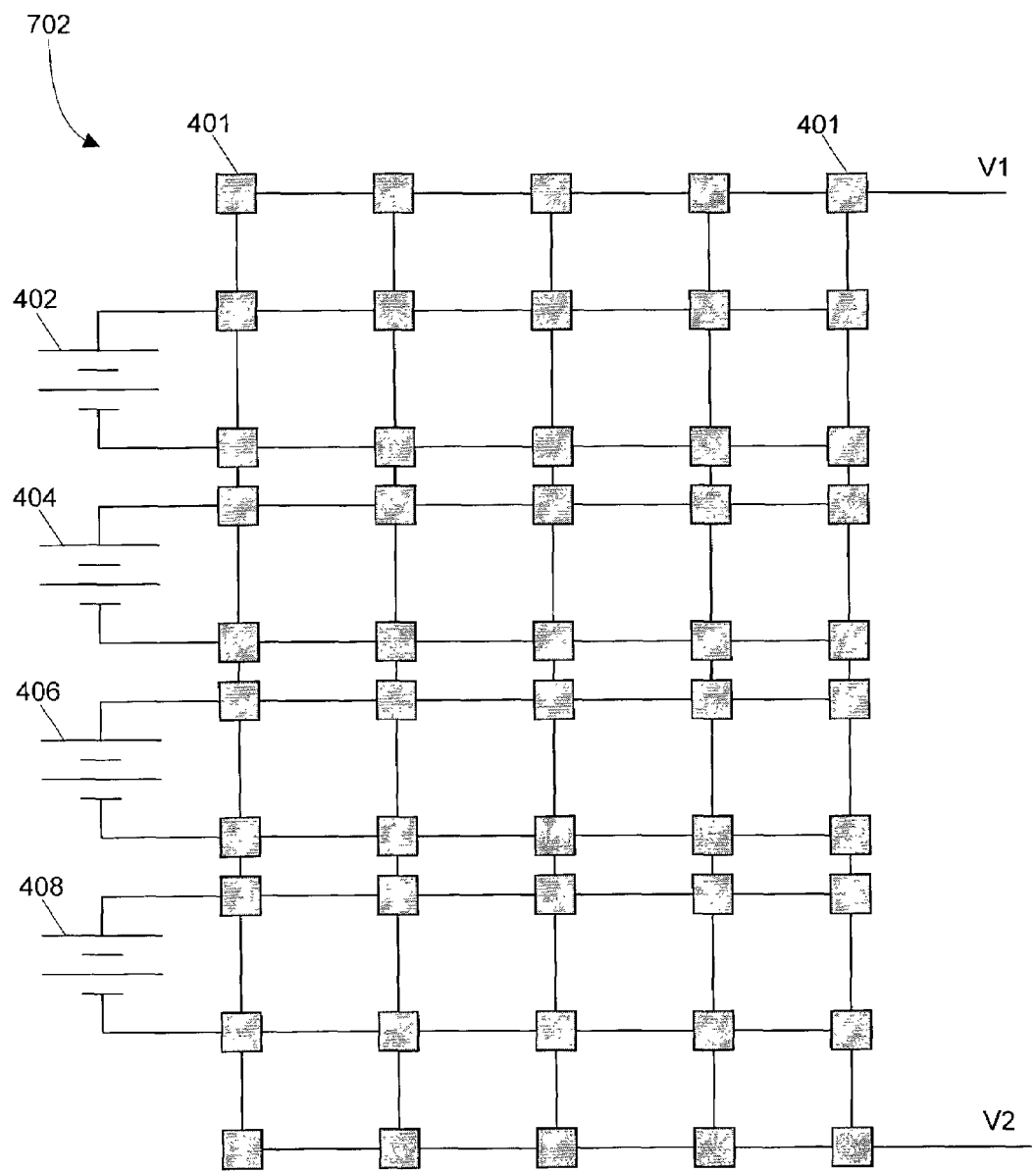
FIG. 8 is a representation of a switch network for a fuel cell apparatus according to principles described herein.
Figure 9:
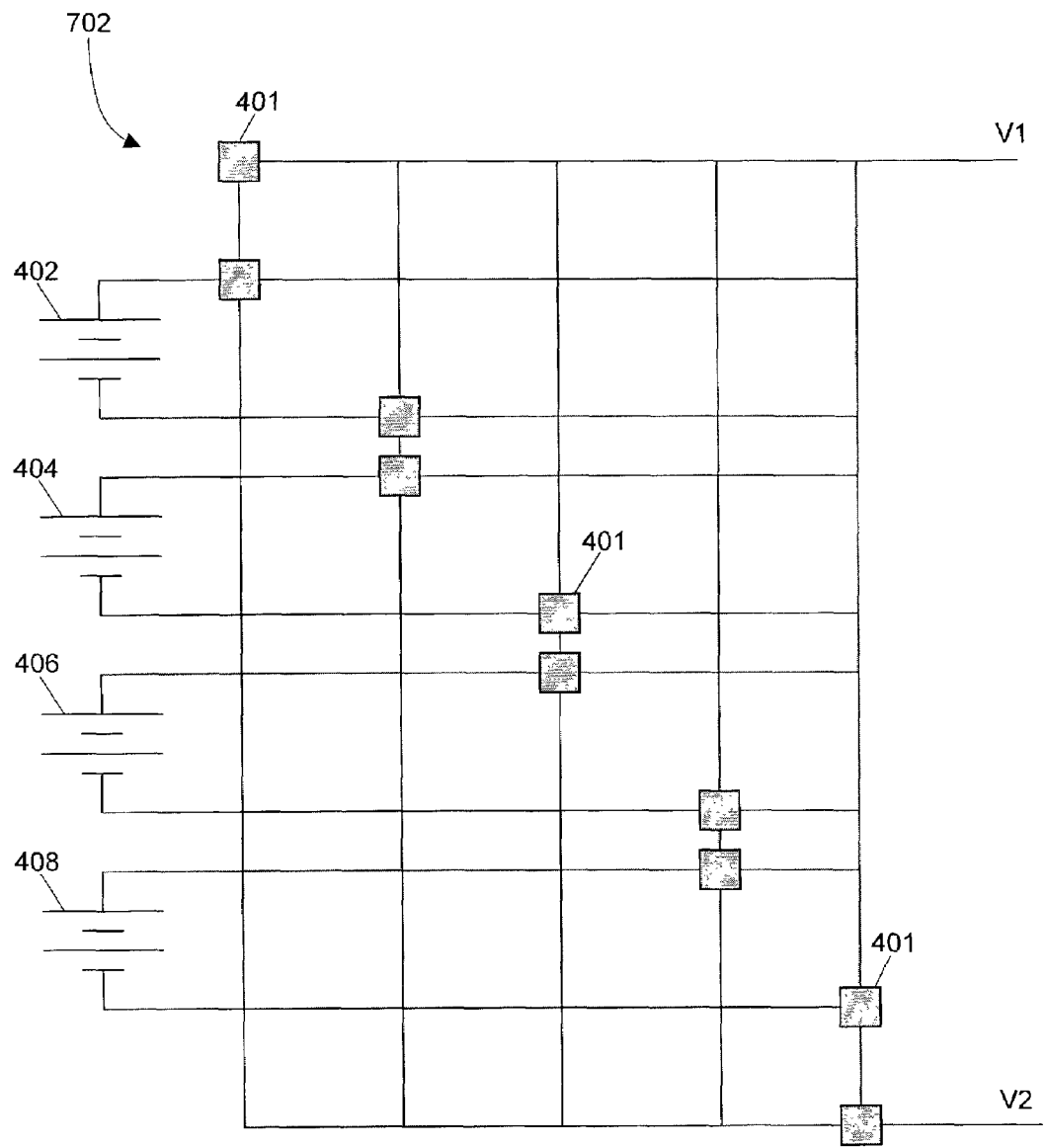
FIG. 9 is a representation of an exemplary configuration of the switch network of FIG. 8 according to principles described herein.
Figure 10:
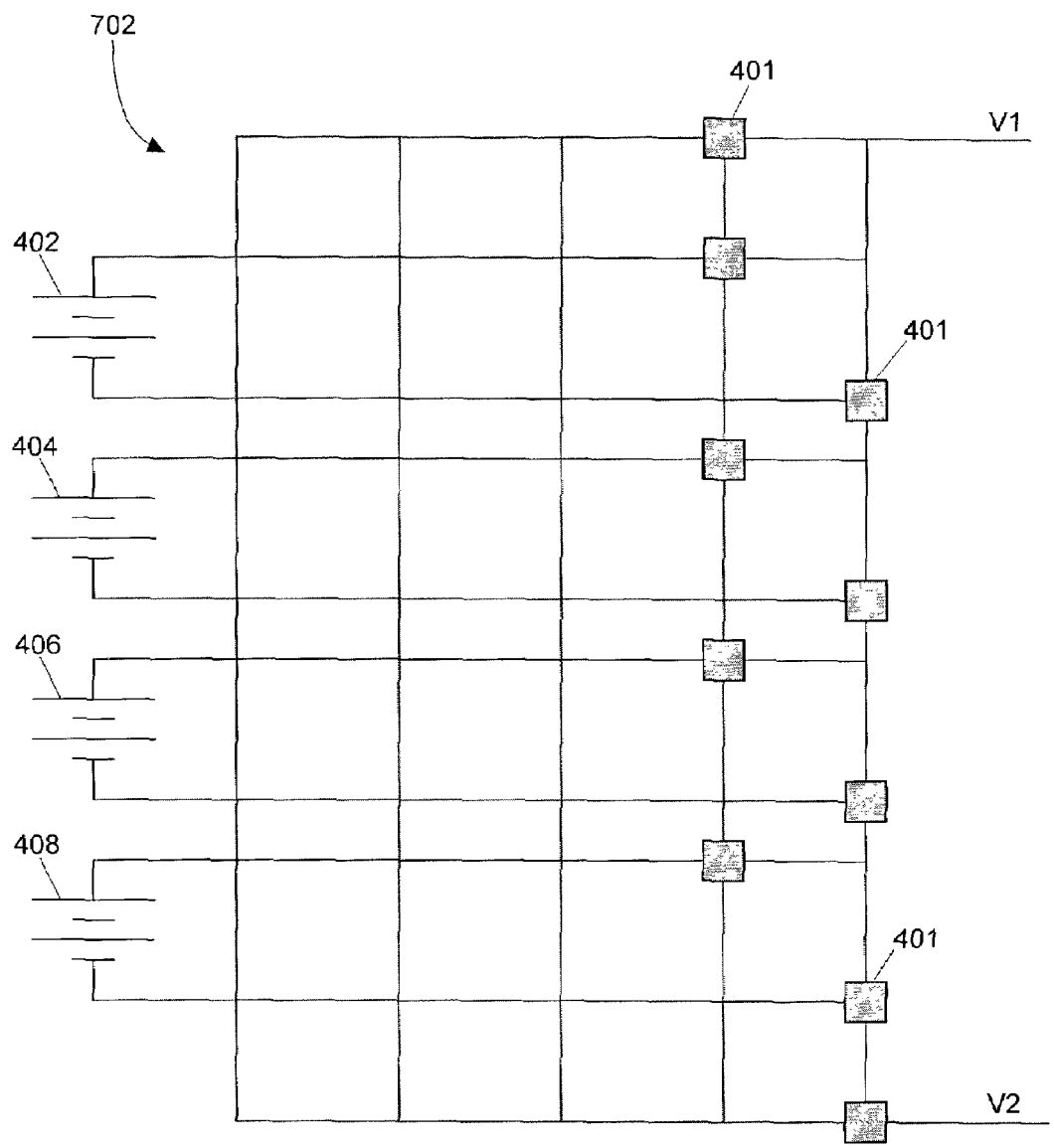
FIG. 10 is a representation of another examplary configuration of the switch network of FIG. 8 according to principles described herein.
Figure 11:
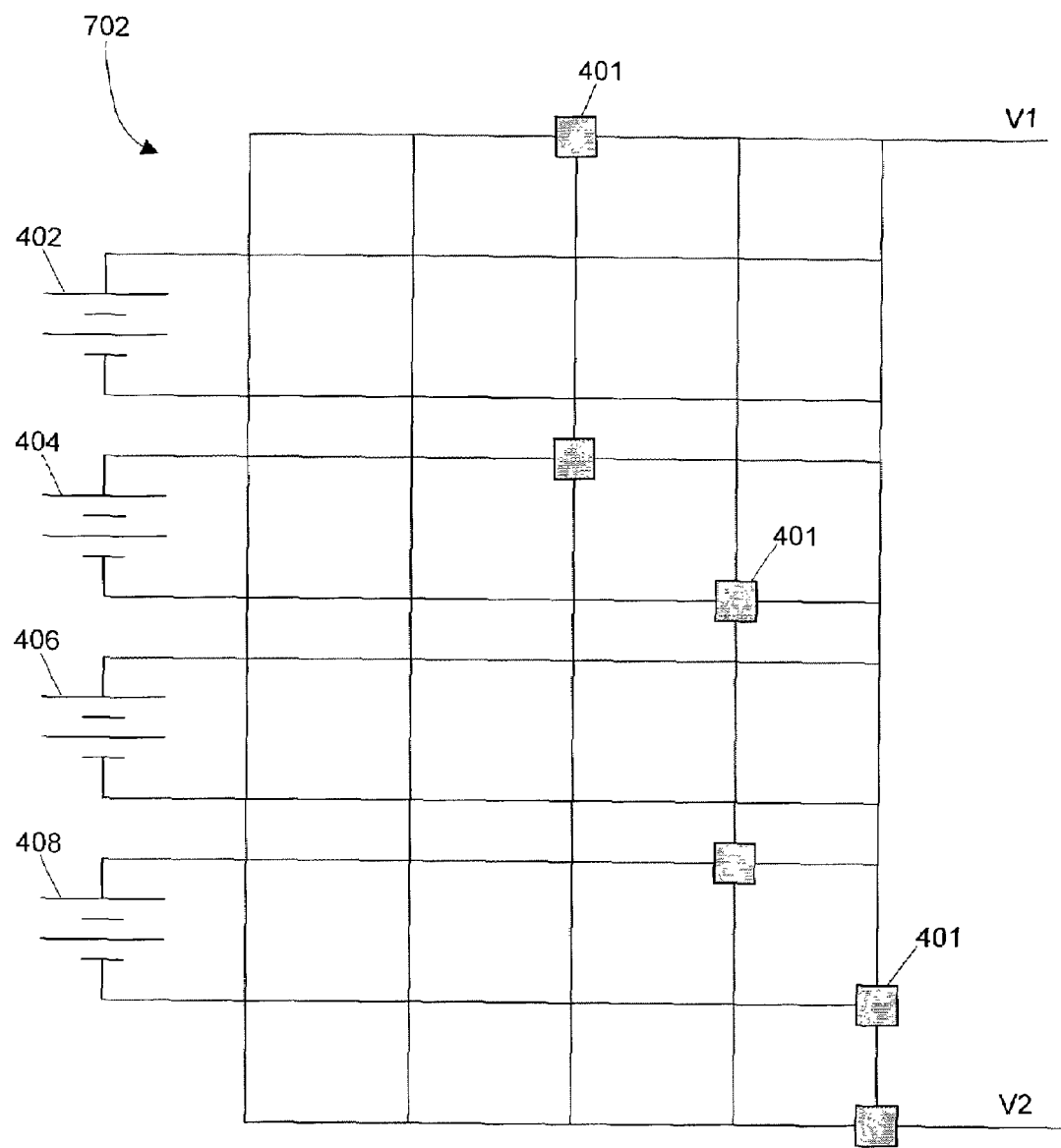
FIG. 11 is a representation of an examplary configuration of the switch network of FIG. 8 according to principles described herein.
Figure 12:
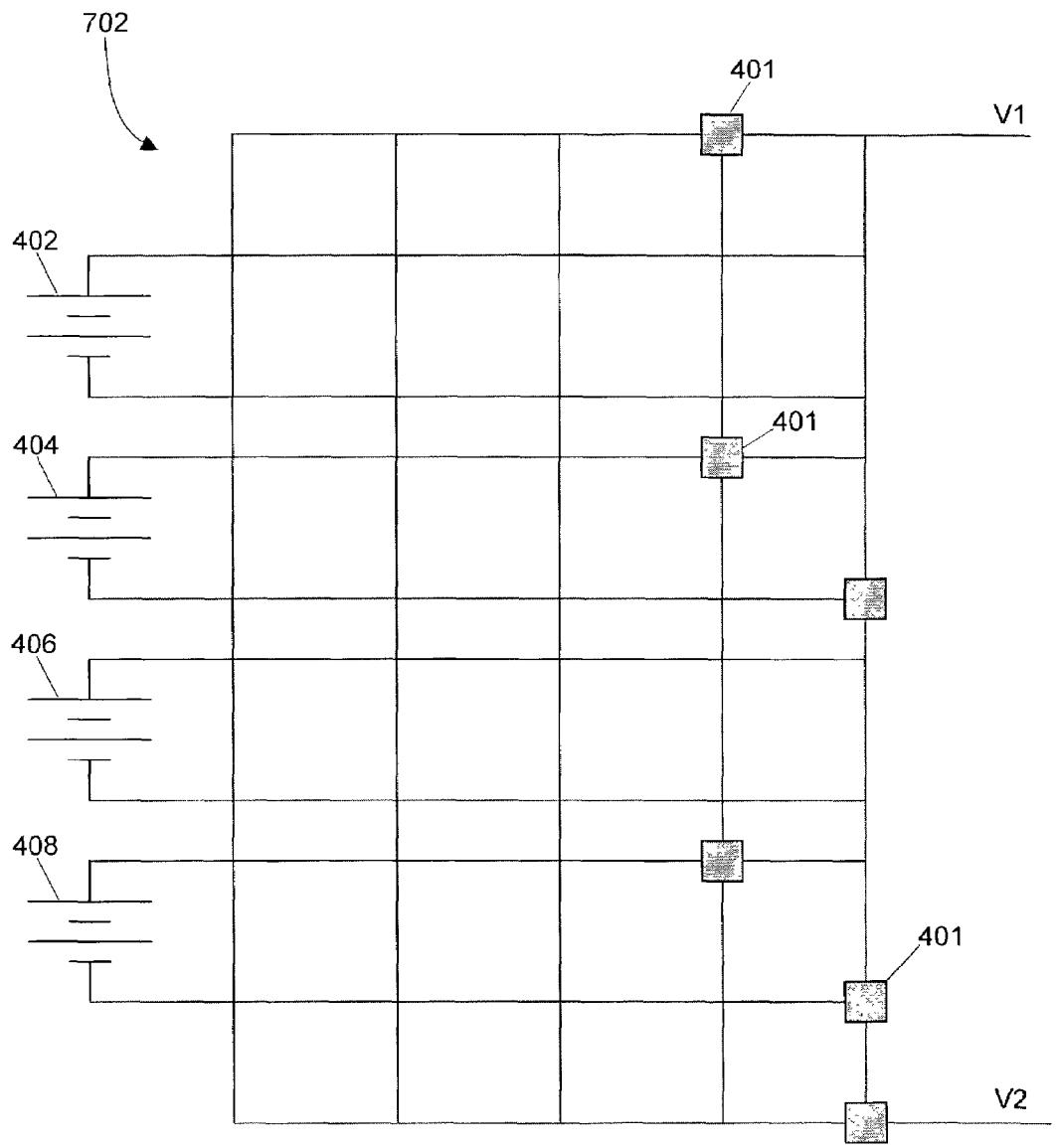
FIG. 12 is a representation of an examplary configuration of the switch network of FIG. 8 according to principles described herein.

Referring to FIG. 8, one embodiment of the switch network (702) is shown. According to the embodiment of FIG. 8, there may be multiple nodes (401) for interconnecting the fuel cell blocks (402/404/406/408) in any number of configurations. Each of the nodes (401) represents a possible electrical connection point that may include a switch (FIGS. 5B and 5C) that can be selectively opened and closed to electrically reconfigure the fuel cell blocks (402/404/406/408). For example, the fuel cell blocks (402/404/406/408) may be configured in series if desired by closing connections at the nodes (401) shown in FIG. 9 (the absence of a node (401) in the present embodiment represents an open circuit condition). Further, the fuel cell blocks (402/404/406/408) may also be reconfigured in parallel by closing connections at the nodes (401) shown in FIG. 10. Other configurations are also possible, for example an electrical configuration shown in FIG. 11 wherein two fuel cell blocks (404 and 408) are configured in series, and the remaining two fuel cell blocks (402 and 406) are idle. Another example of a possible electrical configuration is shown in FIG. 12 wherein two fuel cell blocks (404 and 408) are configured in parallel, and the other two fuel cell blocks (402 and 406) are idle. It will be understood that any number of other electrical reconfigurations may be possible according the present invention, and that the configurations shown in FIGS. 9-12 are examplary in nature.

It will be understood that the multiple configurations enabled by the structures described above may be implemented to simultaneously provide multiple voltages to a load device by re-configuring the fuel cell blocks. Many modern electronics require multiple and different voltages currents (e.g. a computer requiring power for a CPU, a display, a fan, etc.), and the principles described herein allow for the fuel cell stacks to be reconfigured to provide the multiple electrical requirements simultaneously.

As discussed above, these principles may be exploited in a variety of fuel cell types. For example, solid oxide fuel cells (SOFC), proton exchange membrane fuel cells, phosphoric acid, and other derivatives of these fuel cells will benefit from the techniques described herein. However, the techniques described may be most suitable for SPFC's.

Figure 13:
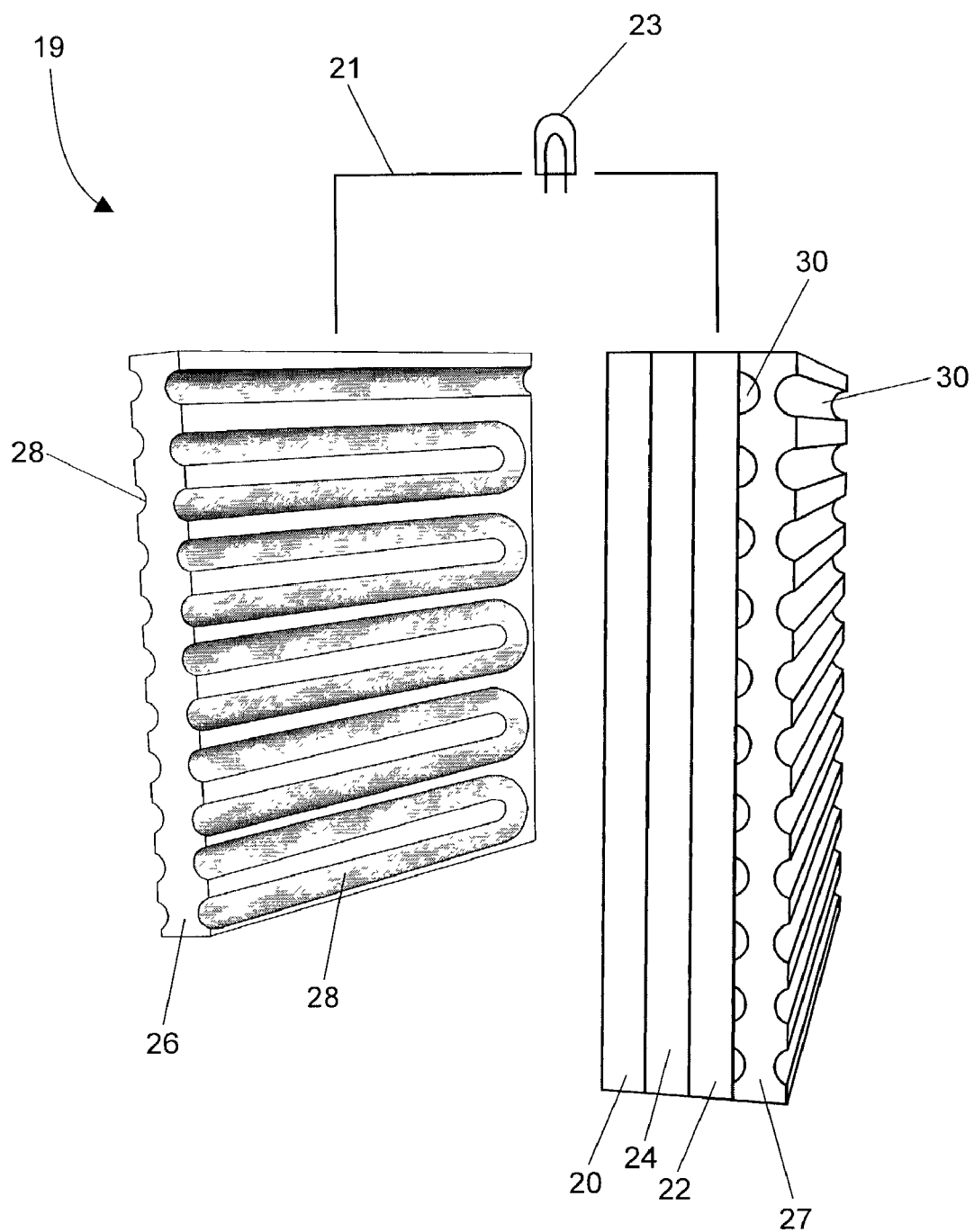
FIG. 13 is a perspective view of a solid oxide fuel cell apparatus according to principles described herein.

Referring to FIG. 13, a planar solid oxide fuel cell (19) is shown. The SOFCs are currently believed to be a very promising fuel cell technology, and allow the use of a variety of fuels (e.g., hydrogen, hydrocarbons, alcohols, etc.) without the use of a reformer. The SOFC (19) includes four basic elements: an anode (20), a cathode (22), an electrolyte (24), and bipolar plates (26 and 27)) arranged outside of the anode (20) and cathode (22), respectively. The electrolyte (24) is sandwiched between the anode (20) and cathode (22).

The bipolar plate (26) in contact with the anode (20) is the negative post of the fuel cell (19) and conducts electrons that are freed from the fuel such that the electrons can be used in an external circuit (21). The bipolar plate (26) includes channels (28) patterned therein to disperse the fuel as evenly as possible over the surface of the anode (20), and remove any fuel products from the anode (20) region (e.g., water, carbon dioxide, etc.).

The bipolar plate (27) in contact with the cathode (22) is the positive post of the fuel cell (19). The bipolar plate (27) has channels (30) patterned therein to evenly distribute oxygen (usually air) to the surface of the cathode (22), and provide for the removal of oxygen depleted air. The bipolar plate (27) also conducts the electrons back from the external circuit (21) to the cathode (22), where they combine with molecular oxygen to form oxygen ions.

The electrolyte (24) in the present embodiment is a solid oxide membrane. The electrolyte (24) is typically a high temperature ceramic material that ideally conducts only oxygen ions. This electrolyte (24) prevents the passage of electrons and is impervious to the gaseous reactants and products.

The anode (20) may be a ceramic/metal mixture (cermet, e.g., yttria stabilized zirconia/nickel, samaria doped ceria/nickel, etc.). The anode (20) is usually porous so as to maximize the three-phase boundary. The anode (20) facilities the oxidation of the fuel.

The cathode (22) is typically a composite mixture of an electrocatalyst and an oxygen ion conductor (e.g., lanthanum strontium manganite/yttria stabilized zirconia, samarium strontium cobaltite/samaria doped ceria, etc.). The cathode (22) is usually porous so as to maximize the three-phase boundary. The cathode (22) facilies the reduction of the oxidant.

In a working fuel cell, the electrolyte (24) is sandwiched between the anode (20) and the cathode (22). The operation of the fuel cell can be described generally as follows. The fuel (e.g., hydrocarbon, $H_2$, carbon monoxide, etc.) enters the fuel cell on the anode (20) side. When the fuel comes into contact with the catalyst on the anode (26), ions and electrons are formed by oxidizing the fuel at the anode, and electrons ($e^-$) are formed. The electrons are conducted through the anode (20) to the bipolar plate (26) where they make their way through the external circuit (21) that may be providing power to do useful work (such as turning a motor or lighting a bulb (23)) and return to the cathode side of the fuel cell (19).

Meanwhile, on the cathode (22) side of the fuel cell, molecular oxygen ($O_2$) is present in the air and is flowing along the bipolar plate (27). As $O_2$ is forced along the bipolar plate (27) and across the cathode, it forms two oxygen ions, each having a strong negative charge. These oxygen ions pass through the solid oxide electrolyte and interact with the fuel on the anode (20). When $H_2$ is the fuel for the SOFC (19), the oxygen ions combine to form a water molecule and two electrons for the external circuit (21).

The fuel cell reaction just described produces only about 0.7 volts at a useful current. Therefore, to raise the voltage to a higher level as describe above, many separate fuel cells are often combined to form a fuel cell stack.

Solid oxide fuel cells typically operate at fairly high temperatures (above approximately 800° C.), which allow them to have high reaction kinetics, and use a variety of fuels depending on the anode composition. Lower temperature operation is desired for applications that require raid startup or where inexpensive containment structures, and temperature management is of concern.

In some configurations, the SOFC (19) may be arranged in an array of tubes. However, the present embodiment is shown in the planar stack arrangement shown.

The preceding description has been presented only to illustrate and describe the invention. It is not intended to be exhaustive or to limit the invention to any precise form disclosed. Many modifications and variations are possible in light of the above teaching.

The preceding description is intended to enable other skilled in the art to best utilize the invention in various embodiments and with various modifications as are suited to the particular use contemplated. It is intended that the scope of the invention be defined by the following claims.

What is claimed is:

1. A fuel cell control module comprising circuitry programmed to re-configure connections among a plurality of fuel cells to selectively connect the plurality of fuel cells in series, parallel, or a combination of series and parallel in response to load conditions; wherein one or more of said plurality of fuel cells that is in active operation most often is placed central to said plurality of fuel cells to provide heat to less active fuel cells of said plurality of fuel cells.

2. The control module of claim 1, wherein said control module is programmed to reconfigure said fuel blocks to simultaneously provide multiple electrical outputs comprising different currents and/or different voltages.

3. The control module of claim 1, wherein said control module is programmed to reconfigure said fuel cell blocks in response to changes in load demand.

4. The control module of claim 1, wherein said control module is programmed to receive fuel cell performance data and electrically reconfigure said plurality of fuel cell stacks in response to said fuel cell performance data.

5. A method of controlling fuel cell power output comprising placing one or more of said fuel cell blocks that is in active operation most often central to said multiple fuel cell blocks to provide heat to less active fuel cells and electrically re-configuring one or more connections between multiple fuel cell blocks with a controller to selectively connect the multiple fuel cells with any of series, parallel, or a combination of series and parallel connections in response to load conditions.

6. The method of claim 5, wherein said re-configuring comprises opening or closing one or more switches electrically tied to said one or more connections.

7. The method of claim 5, further comprising monitoring one or more of fuel cell load characteristics, fuel cell performance, and feedback data from a load device.

8. The method of claim 5, further comprising calculating an optimal fuel cell block configuration based on one or more of said fuel cell load characteristics, fuel cell performance, and feedback data from said load device.

9. A method of varying the power output of a fuel cell apparatus comprising:
    placing one or more of said plurality of fuel cell blocks anticipated to be in active operation most often central to said plurality of fuel cell blocks to provide heat to less active fuel cell blocks;
    arranging fuel cell blocks in an automatically re-configurable structure; and
    selectively re-configuring said fuel cell block by selectively connecting the multiple fuel cell blocks with any of series, parallel, or a combination of series and parallel connections in response to load conditions.

10. The method of c claim 9, further comprising simultaneously providing multiple voltages to a load device by re-configuring said fuel cell blocks.

11. The method of claim 9, further comprising monitoring one or more of fuel cell load characteristics, fuel cell performance, and feedback data from a load device.

12. The method of claim 11, further comprising calculating an optimal fuel cell block configuration based on one or more of said fuel cell load characteristics, fuel cell performance, and feedback data from said load device.

* * * * *

UNITED STATES PATENT AND TRADEMARK OFFICE
CERTIFICATE OF CORRECTION

PATENT NO.         : 7,491,457 B2
APPLICATION NO. : 10/222417
DATED                  : February 17, 2009
INVENTOR(S)       : Daniel A. Kearl et al.

It is certified that error appears in the above-identified patent and that said Letters Patent is hereby corrected as shown below:

In column 1, lines 17-18, delete "devolvement" and insert -- development --, therefor.

In column 1, line 46, delete "sill" and insert -- still --, therefor.

In column 1, line 50, delete "may" and insert -- many --, therefor.

In column 3, line 44, insert -- a -- before "DC-to-DC".

In column 3, line 50, delete "includes" and insert -- include --, therefor.

In column 5, line 42, delete "alterative" and insert -- alternative --, therefor.

In column 7, line 16, delete "reconfiguration" and insert -- reconfigurations --, therefor.

In column 7, line 18, delete "bock" and insert -- block --, therefor.

In column 7, line 40, delete "as so to" and insert -- so as to --, therefor.

In column 8, line 30, delete "SPFC's" and insert -- SOFC's --, therefor.

In column 8, line 64, delete "facilities" and insert -- facilitates --, therefor.

In column 9, line 4, delete "facilities" and insert -- facilitates --, therefor.

In column 9, line 29, delete "describe" and insert -- described --, therefor.

In column 9, line 35, delete "raid" and insert -- rapid --, therefor.

In column 9, line 46, delete "other" and insert -- others --, therefor.

In column 10, line 42, in Claim 9, delete "block" and insert -- blocks --, therefor.

UNITED STATES PATENT AND TRADEMARK OFFICE
CERTIFICATE OF CORRECTION

| | |
|---|---|
| PATENT NO. | : 7,491,457 B2 |
| APPLICATION NO. | : 10/222417 |
| DATED | : February 17, 2009 |
| INVENTOR(S) | : Daniel A. Kearl et al. |

It is certified that error appears in the above-identified patent and that said Letters Patent is hereby corrected as shown below:

In column 10, line 46, in Claim 10, delete "of c" and insert -- of --, therefor.

Signed and Sealed this

Nineteenth Day of May, 2009

JOHN DOLL
*Acting Director of the United States Patent and Trademark Office*